United States Patent [19]

Kent

[11] 4,395,028

[45] Jul. 26, 1983

[54] WORKPIECE POSITIONING, CLAMPING AND CONVEYING APPARATUS

[75] Inventor: William C. Kent, Garland, Tex.

[73] Assignee: Western Electric Company, Inc., New York, N.Y.

[21] Appl. No.: 314,941

[22] Filed: Oct. 26, 1981

[51] Int. Cl.³ .............................................. B23Q 1/00
[52] U.S. Cl. ........................................ 269/50; 269/57; 269/152; 269/157; 269/232; 29/760
[58] Field of Search ...................... 269/56–58, 269/63, 232–234, 238, 152–153, 93, 229, 157, 162, 47, 50–52; 29/760, 759, 792, 335, 35.5, 56.6; 409/905

[56] References Cited

U.S. PATENT DOCUMENTS 3,127,162  3/1964  Miller ................................. 269/157
3,648,347  3/1972  Gay ..................................... 269/50
3,706,122  12/1972  LaValle .
4,271,581  6/1981  Eitzinger ........................... 29/56.6

Primary Examiner—Robert C. Watson
Attorney, Agent, or Firm—R. P. Miller

[57] ABSTRACT

Connector housings (12) are pushed into a succession of nests (26) formed in workholders (17) mounted on an incrementally advanced turntable (15). Subsequent advance of a workhokder from the connector load station causes a cam follower (42) of a spring-biased lever arrangement (37) to react with a cam track (19) to pivot and move locating pins (31 and 32) into holes (13 and 14) formed in the connector housing. Further advance of the turntable (15) causes a cam follower (64) to ride onto a high portion of a cam track (21) to pivot a second lever arrangement (37) to move a spring-biased, pivotally mounted clamping arm (51) into engagement with the precisely positioned connector housing.

6 Claims, 7 Drawing Figures

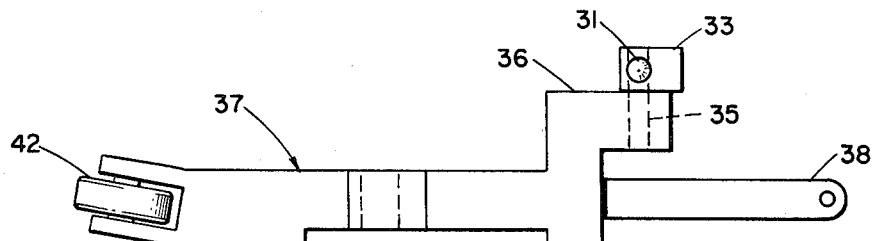
FIG. 4
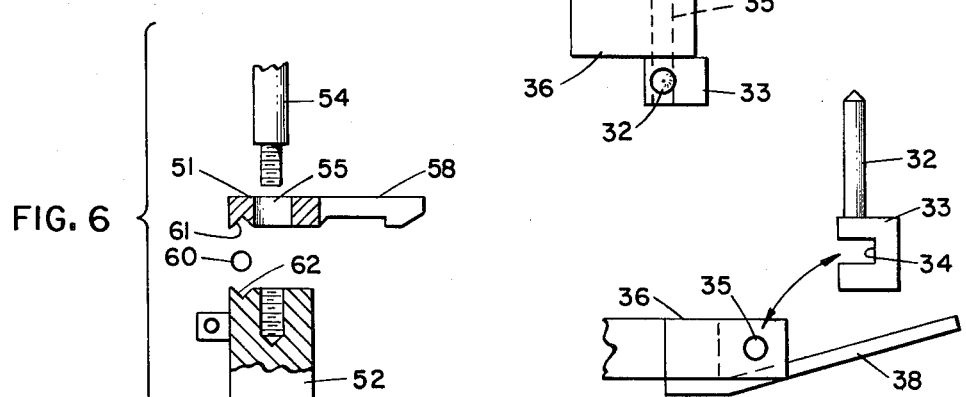
FIG. 6
FIG. 5
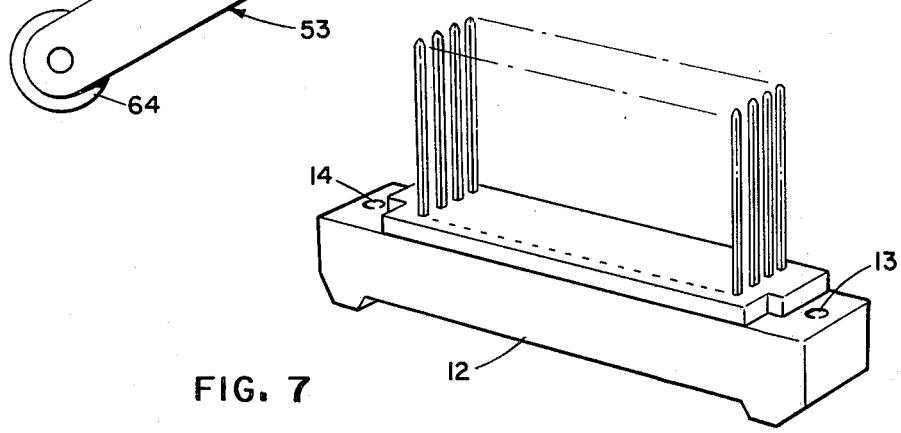
FIG. 7

WORKPIECE POSITIONING, CLAMPING AND CONVEYING APPARATUS

FIELD OF THE INVENTION

This invention relates to apparatus for precisely positioning and clamping workpieces in workholders mounted on a conveyor and, more particularly, to turntable mounted workholders having workpiece positioning and clamping facilities that are sequentially operated upon movement of the turntable to advance a succession of workpieces through a number of work fabricating, assembling and/or testing stations.

BACKGROUND OF THE INVENTION

In the manufacture of electrical devices, such as connectors, it is manifest for economical production that as many as possible of the fabricating, assembling and testing operations be performed on automated facilities. One of the problems in the use of such facilities is that a basic piece part on which the subsequent manufacturing operations are performed must be precisely positioned in such a way that the subsequent operations can be performed without interference with the positioning and clamping devices. Due to the high production requirements of such automated facilities it is also desirable that all component devices be positive acting, be simple in design, be rugged in construction and be susceptible to facile maintenance.

Numerous automated facilities have been developed and used to assemble various types of electrical devices. For example, in U.S. Pat. No. 3,706,122 issued Dec. 19, 1972, to T. A. LaValle, there is shown a turntable on which is mounted a number of workholders for receiving a basic component to which additional components are attached upon movement of the turntable to advance the workholders through a number of subsequent work stations. The basic workpiece, a pin and sleeve, is oriented and dropped between the open jaws of a chuck which is controlled by an air cylinder to open and close about the workpiece. At the subsequent work stations, a wire is attached to the workpiece and the chuck is rotated during advance of the turntable by engaging a pinion secured to the chuck with a rack located external to the turntable. As the chuck is rotated, the wire is wound around the workpiece while a wire guide arm is moved to distribute the wire. The movement of the wire guide arm is controlled by a cam follower that rides on a cam surface which is external to the turntable.

SUMMARY OF THE INVENTION

The present invention contemplates, among other things, a conveyor having a workholder mounted thereon together with easy to maintain and positively actuated facilities that are operated by external cam surfaces to precisely position and then clamp a workpiece in a nest formed in the workholder.

More particularly, a turntable is provided on which is supported a series of workholders each having a nest for receiving a connector housing. A first lever means is mounted on the workholder and includes a cam follower section that extends through a hole in the turntable to ride on a first cam track, and a second lever section that controls a pair of spring biasing locating pins that extend through and into the workholder. As the turntable is rotated, the cam follower section of the first lever means reacts on the cam surface to pivot and release the spring-biased locating means which move into openings formed in the connector housing to precisely locate the housing within the nest.

A second lever means is mounted on each workholder and includes a cam follower arm section that extends through the hole in the turntable to ride on a second cam track and a second lever section on which is pivotally mounted a spring-biased clamp that is adapted to engage the precisely positioned connector. This second lever means is operated by the reaction of the moving cam follower arm section against the stationary cam track and occurs subsequent to the operation of the locating pins so that the precisely positioned connector housing is held firmly by the spring-biased clamp.

DESCRIPTION OF THE DRAWINGS

Other features and advantages of the invention will be apparent upon consideration of the following detailed description when considered in conjunction with the drawings, wherein

FIG. 4 is a top view of the lever means for operating the positioning facilities;

FIG. 5 is a detached, fragmentary side elevational view of the lever means shown in FIG. 4;

FIG. 6 is an exploded, fragmentary, side elevational view of the lever means for operating the clamping facilities; and FIG. 7 is a perspective view of a connector housing that may be precisely located and clamped in the workholder shown in the other figures.

DETAILED DESCRIPTION

Referring to FIG. 7, there is shown a connector housing 12 which will serve as an illustration of the utility of the invention. It is understood that many other types of products may be gripped and conveyed utilizing variations of the structure of the invention. The connector housing includes a pair of holes 13 and 14 into which screws are subsequently inserted to secure the connector components together. In the assembly of this connector, the housing is progressed through a number of automated assembly stations (not shown) whereat additional component parts are assembled onto the housing.

Figure 1:
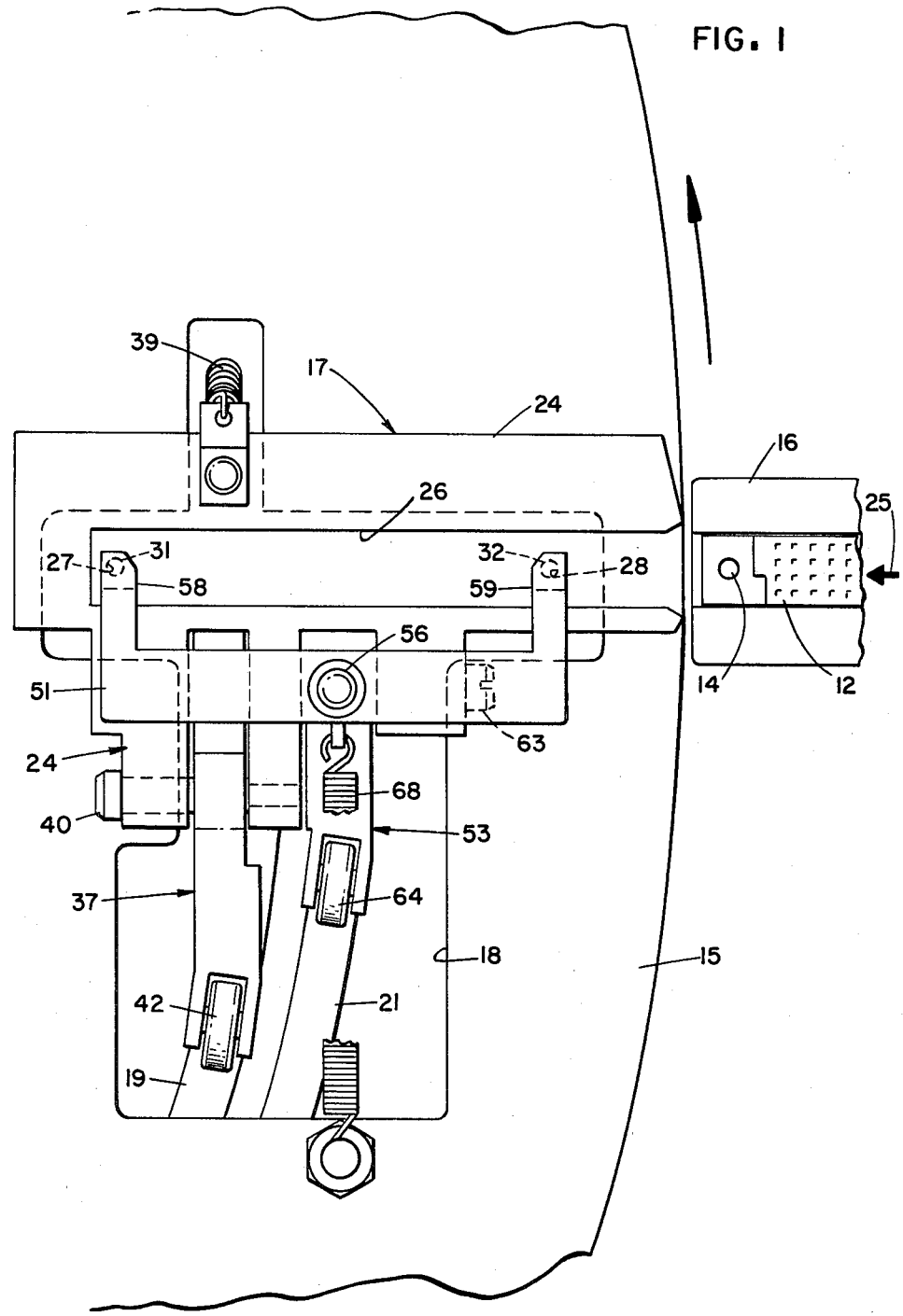
FIG. 1 is a top plan view of a section of a turntable on which is mounted one of a series of workholders having facilities for precisely positioning and clamping a workpiece in accordance with the principles of the invention.

Referring to FIG. 1, there is depicted a turntable 15 which is incrementally advanced through a number of work stations such as denoted by the reference numeral 16. The illustrated station 16 is a load station whereat the housings 12 are sequentially positioned onto the turntable and into one of a series of workholders 17. The turntable 15 may be cyclically indexed by anyone of a number of commercially available drive systems.

Figure 2:
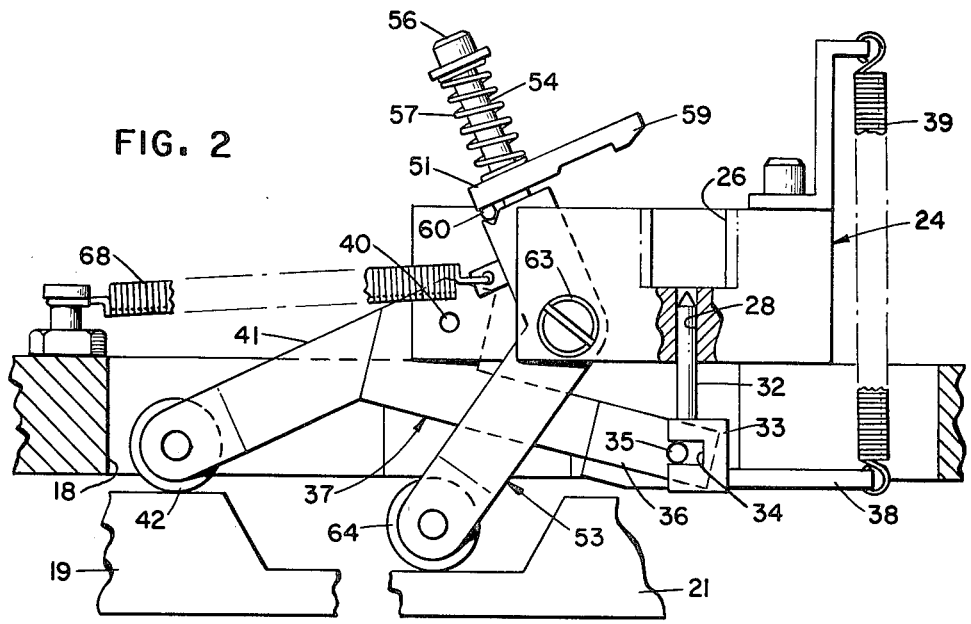
FIG. 2 is a side elevational view of FIG. 1 particularly showing the workholder in an open position and the construction of a pair of cam actuated lever means for operating the work locating and clamping facilities.
Figure 3:
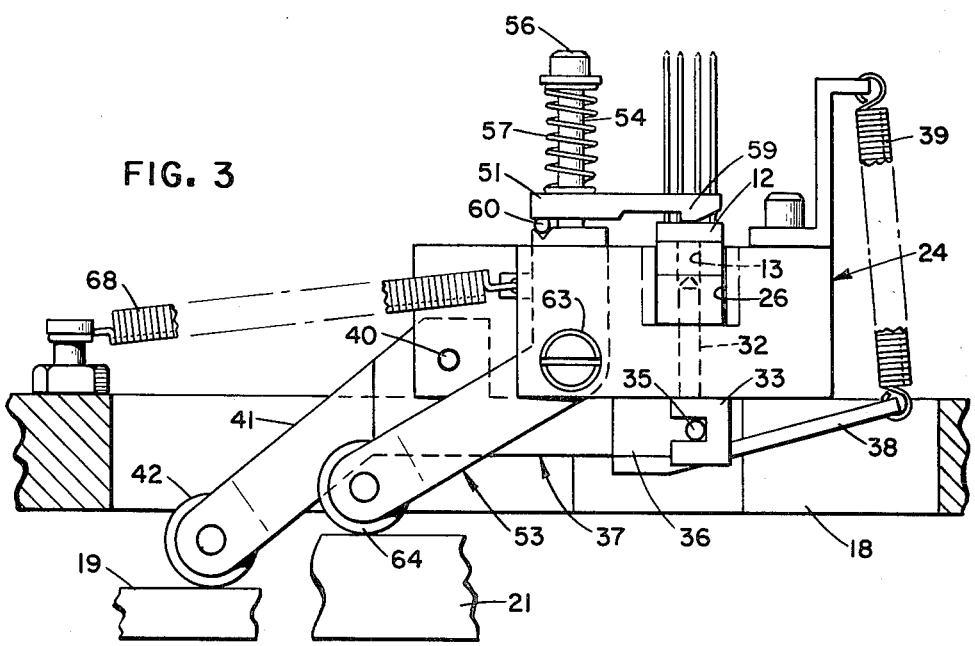
FIG. 3 is a view similar to FIG. 2 but showing the workholder in a closed position with the work locating and clamping facilities in position to precisely position and clamp a workpiece in the workholder.

Positioned below the turntable 15 are a pair of cam tracks 19 and 21 which have top surfaces contoured to actuate (1) a mechanism for accurately positioning the housing in the workholder 17 and (2) a clamping device for holding the precisely positioned housing during subsequent fabricating, assembling and/or testing operations. The workholder 17 is best shown in FIGS. 1, 2 and 3 and consists of a housing 24 having a nest 26 for receiving the connector housing 12. As each workholder 17 is advanced into a load station 16, a pusher designated by the arrow 25 is rendered effective to advance a housing into the nest 26. The advanced housing is loosely positioned in the nest and must be precisely positioned and clamped before subsequent work operations can be performed.

A pair of bores 27 and 28 are formed near opposite ends of the bottom of the nest and are adapted to receive a pair of locating pins 31 and 32 having tapered tips. Each pin 31 or 32 (see also FIGS. 4 and 5) is mounted in a block 33 having a slot 34 for receiving short dowels 35 extending from each of a pair of arms 36 of a first bifurcated lever arrangement 37. The lever arrangement includes a projecting arm 38 that is connected to a spring 39 which acts to pivot the lever about a pivot pin 40 so as to normally urge the locating pins 31 and 32 through the holes 27 and 28 in the fixture. Due to the tapered nature of the pins 31 and 32, the advancing pins move within the connector housing holes 13 and 14 to act against the hole walls to precisely locate the connector 12 in the nest. The lever arrangement 37 includes a trailing extremity 41 which provides a mounting for a cam follower roller 42 that rides on the cam track 19.

When the workholder 17 (see FIG. 2) approaches the load station 16, the cam follower 42 rides up on a high portion of the cam track 19 to pivot the lever arrangement 37 about the pin 40 to move the right-hand portions or sections of the lever arrangement downwardly so that the dowels 35 acting in the slotted blocks 33 function to withdraw the locating pins 31 and 32. Following the loading of a connector 12 in the positioned nest 26 and subsequent advance of the turntable, the cam follower 42 will ride off of the high portion of the cam 19 so that the spring 39 is rendered effective to pivot the lever arrangement 37 to move the locating pins 31 and 32 into the nest thus allowing the tapered ends of the pins to enter and act against the walls of the holes to precisely position the opposite ends of the connector (see FIG. 3).

Following loading of the nest with a connector housing 12 and the subsequent advance of the turntable 15, the precisely positioned housing is then held by a spring-urged U-shaped holding or clamping arm 51. The arm 51 is mounted on an upwardly projecting end section 52 of a second lever arrangement 53. A post 54 (see FIG. 6) extends from the top end of the lever 53 to project through a circular hole 55 formed in the U-shaped arm. The hole 55 is somewhat larger than the diameter of the post 54. A cap 56 is secured to the top of the post 54 and functions to hold a spring 57 against the arm 51. The arm 51 is provided with beveled holddown extensions 58 and 59 which, when pivoted, (see FIGS. 2 and 3) act to engage and hold the precisely positioned connector in the nest. It will be noted that the top of the lever end section 52 (see FIG. 6) and the bottom of the crosspiece of the U-shaped arm 51 are provided with notches 61 and 62 for supporting a short section of rod 60. The rod 60 acts as a fulcrum for the spring-pressed arm 51 so that the arm 51 may shift slightly or pivot relative to the post 54 to adjust itself for slightly different size connector housings. The lever arrangement 53 is mounted on a stud bearing pin 63 and has a split trailing extremity (see FIG. 1) in which is mounted a roller 64 that is adapted to engage and ride on the cam 21.

A spring 68 is attached to the lever arrangement 53 to normally urge the lever arrangement to pivot about pin 63 to urge the holding arm 51 (see FIG. 2) to withdraw from engagement with the connector housing. When the connector housing 12 is loaded into the nest and the turntable 15 is indexed, the roller rides up onto a high portion of the cam 21 (see FIG. 3) so that the spring-urged holding arm 51 moves into engagement with the connector housing 12 and the spring 57, which is slightly flexed, acts to hold the arm in engagement with the now precisely positioned connector housing.

In summary of the particular embodiment of the invention shown, the turntable 15 is incrementally advanced to position each successive workholder 17 to receive a connector housing 12 at the load station 16. A connector housing is pushed into the nest 26. The controls for the turntable then initiate another incremental advance, at which time the cam follower roller 42 rides from the high portion of the cam 19 to pivot the lever arrangement 37 under the urging of the extended spring 39, whereupon the dowels 35 acting in the slots 34 lift the pins 31 and 32 to enter the holes 14 formed in the connector housing.

Subsequent advance of the turntable 15 causes the cam follower roller 64 to ride onto the high portion of the cam 21 thus stretching the spring 68 and pivoting the lever arrangement 53. Upon pivotal movement of the upper portion of the lever arrangement 53, the spring-biased clamping arm 51 moves toward the connector to engage the beveled holddown extensions 58 and 59 thereof with the top surface of the connector housing 12. The independent mounting of the U-shaped clamping arm allows the arm to pivot against the spring 57 relative to the lever arrangement 53 to accommodate variations in the heights of the connector housing 12. Inasmuch as the hole 55 formed in the arm 51 is slightly larger than the diameter of the post 54, the clamping arm is permitted to pivot relative to the lever arrangement 53.

What is claimed is:

1. An apparatus for locating and clamping an article, which comprises:

a workholder having a nest formed therein to receive an article with a hole therein;

a locating pin slidably mounted in the workholder for movement into the nest and into the hole formed in the article;

a clamp for engaging the article positioned in said nest;

a first lever means having a first cam follower mounted on one end thereof and means mounted on the other end for moving said slidable pin into the nest and in the hole formed in the article positioned in said nest to accurately locate the article in the nest;

a second lever means having a second cam follower mounted on one end and means mounted on the other end for pivotally mounting said clamp;

spring means for urging said clamp against said other end of said second lever; and cam track means for sequentially engaging said first and second cam followers to pivot said first and second lever means to sequentially move said locating pin into the hole formed in the article positioned in said nest, and to pivot said clamp to engage the article positioned by said locating pin.

2. An apparatus as set forth in claim 1, wherein the means for pivotally mounting the clamp includes a rod positioned within a pair of notches respectively formed in said other end of the second lever means and the clamp.

3. An apparatus as set forth in claim 1, wherein the means for mounting the clamp include a post extending from said other end of the second lever means, and the clamp includes a hole somewhat larger than the post for receiving the post.

4. An apparatus for holding an article on a moving carrier, which comprises:
- a fixture mounted on the carrier having a recessed nest for receiving an article, said fixture having a hole therethrough which terminates in the bottom of the nest;
- a locating pin slidably mounted in said hole for movement into and out of said nest;
- a lever pivotally mounted about its midsection on said fixture for moving said locating pin;
- resilient means urging said lever to pivot and move said locating pin into said nest to engage an article positioned therein;
- a cam follower mounted on a first end of said lever;
- a first cam positioned adjacent to the moving carrier and having a surface contoured to engage and pivot said lever against the effect of said resilient means to move said locating pin into said nest to engage an article positioned therein;
- a holddown arm for engaging and holding an article in said nest;
- a second lever pivotally mounted on said frame;
- means for resiliently forcing said holddown arm against a first end of said lever; and
- a second cam positioned adjacent to said moving carrier for engaging and pivoting said second lever to pivot said holddown arm against an article positioned in said nest.

5. An apparatus for advancing and gripping an article having a locating hole formed therein, which comprises:
- a turntable having an opening therethrough adjacent to the periphery thereof;
- a workholder mounted on the turntable; said workholder having a nest formed therein and a bore extending from the bottom of the nest through said workholder; said nest being adapted to receive and position an article with the locating hole generally aligned with said bore;
- a first lever means pivotally mounted on the workholder and having an end section extending through the hole in the turntable;
- a locating pin slidably mounted in the bore formed in said workholder for movement into a locating hole formed in an article positioned in said nest;
- means coupling said pin to said first lever means;
- a second lever means pivotally mounted on said workholder and having a first end section extending through the hole in said turntable;
- a spring loaded clamp means mounted on a second end section of said second lever means for movement to engage an article positioned in said nest;
- means for rotating said turntable; and
- means positioned in the paths of movement of the end sections of the first and second lever means for sequentially pivoting the first lever means to move said pin through said bore into an opening formed in an article positioned in said nest to fix the location of the article in the nest, and then pivoting the second lever means to move the spring-loaded clamp member onto the article positioned and located in said nest.

6. An apparatus for advancing workpieces, which comprises:
- a turntable having an opening therethrough formed in the peripheral area;
- a workholder mounted on top of said turntable adjacent said opening and having a nest for receiving a workpiece, said holder having a bore extending therethrough into said nest;
- a locating pin slidably mounted in said bore for engaging a workpiece placed in said nest;
- a clamping lever pivotally mounted on said workholder for engaging a workpiece placed in said nest;
- a first actuating lever extending through said hole in said turntable having a first cam follower for moving said locating pin;
- first spring means connected to said first actuating lever for urging said locating pin to engage a workpiece placed in said nest;
- a second actuating lever extending through said hole in the turntable and having a second cam follower for moving said clamping lever;
- second spring means connected to said second actuating lever for holding said clamping lever from engagement with a workpiece placed in said nest;
- means for rotating the turntable;
- a first cam track positioned beneath said turntable for engaging said first cam follower and pivoting said first actuating lever to move said locating pin to engage a workpiece in said nest; and
- a second cam track positioned beneath said turntable for engaging said second cam follower and pivoting said second actuating lever to move said clamping lever to engage a workpiece placed in said nest.

* * * * *